Figure 1:
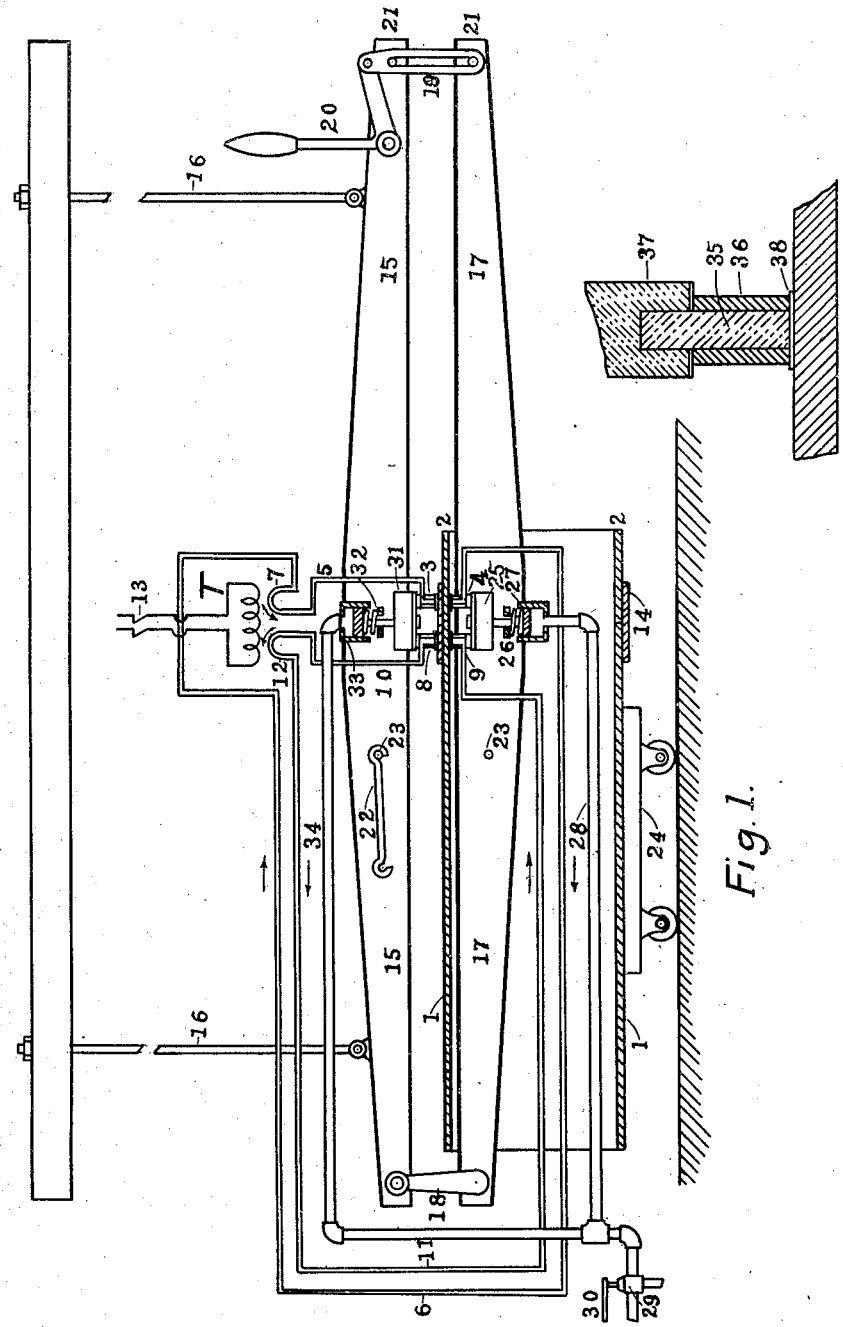

C. H. KICKLIGHTER.
METHOD OF AND APPARATUS FOR ELECTRIC WELDING OF METALLIC PLATES.
APPLICATION FILED OCT. 15, 1913.

1,189,581.

Patented July 4, 1916.
2 SHEETS—SHEET 2.

WITNESSES:
Jack Bracewell
Graham Kilbourn

INVENTOR.
Chas. H. Kicklighter

UNITED STATES PATENT OFFICE.

CHARLES H. KICKLIGHTER, OF ATLANTA, GEORGIA.

METHOD OF AND APPARATUS FOR ELECTRIC WELDING OF METALLIC PLATES.

1,189,581. Specification of Letters Patent. Patented July 4, 1916.

Application filed October 15, 1913. Serial No. 795,311.

*To all whom it may concern:*

Be it known that I, CHARLES H. KICKLIGHTER, a citizen of the United States, residing at Atlanta, in the county of Fulton and State of Georgia, have invented new and useful Improvements in the Method of and Apparatus for Electric Welding of Metal Plates, of which the following is a specification.

This invention relates to the method of and apparatus for electric welding of metal plates into cylinders and other forms.

Many attempts have been made to spot weld pipes or heavy plates, but self-inductance has weakened the welding current and eddy currents have surged through the steel plates, causing heat and waste of energy. In my patent on electric welding No. 1,070,966, granted August 19, 1913, I employed a single loop of copper, linked about the same iron material with which the conductors bearing the welding current are linked. In this case I relied upon the current induced in this loop to oppose the self-inductance and eddy currents.

The primary object of this invention is to provide more efficient and positive means for attaining these results,—that is for opposing the flow of magnetic flux which causes self-inductance, and for eliminating the eddy currents.

The method, employed for attaining the above results, is the subjection of a portion of this loop to an external influence to assist in the development of the current necessary to produce the desired results. This may be done by passing a portion of the loop around the core of the welding transformer itself or of a similar transformer. In fact, welding terminals may be added to the ends of the modified loop and the current designed for removing self-inductance and eddy currents may be utilized for welding purposes. In this latter case, the equipment resolves itself into an apparatus having two sets of welding conductors and two sets of welding terminals. The current in adjacent conductors flows in opposite directions.

Another object of this invention is to provide efficient and simple means for applying the requisite pressure of the welding terminals against the plate at the points to be spot welded. This is an important point in work on heavy plates. Heretofore the beams for applying this pressure have been of the cantaliver or overhanging type. I employ two simple beams connected at both ends. These are stronger, lighter and are adapted to work on a cylinder of greater length.

Still another object of this invention is to provide a type of welding terminal and a method of applying same, whereby greater pressure at the points of contact may be exerted and less trouble experienced due to wearing away and melting down of these copper welding terminals.

Cold rolled copper has been employed heretofore for the welding terminals. In spot welding heavy plates, two difficulties have developed in using these terminals. First, under the heavy pressure sometimes necessary to force the plates firmly together and insure a good electrical contact for a low voltage, these copper points are bent and deformed. Second, it is found necessary in spot-welding heavy plates to continue the current through the plates for such a length of time that the heat developed is transmitted to the copper welding terminals, thereby softening, melting and burning them away rapidly. I propose to use a ferrule of alloy steel, similar to the commercial "high speed steel", or other alloy of strength and high fusing temperature. This will fit snugly around a copper core and will serve the double purpose of transmitting the mechanical pressure to the plates and also of holding the copper core terminal in shape and preservation when heated.

Other objects and advantages of this invention will hereinafter appear, and the novel features thereof will be specifically pointed out in the appended claims.

In order that this process and some of the ways in which it can be applied may be clearly understood, reference is made to the accompanying drawings, forming a part of this specification, and in which,—

Figure 2:
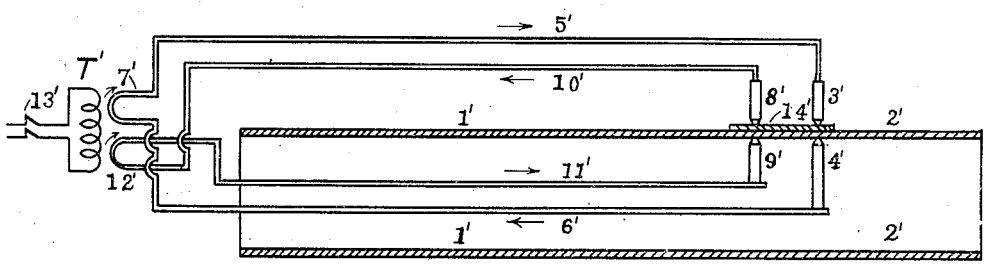
Figure 3:
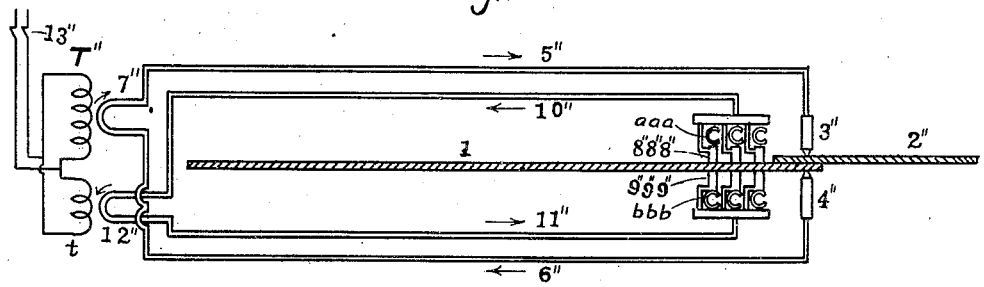
Figure 5:
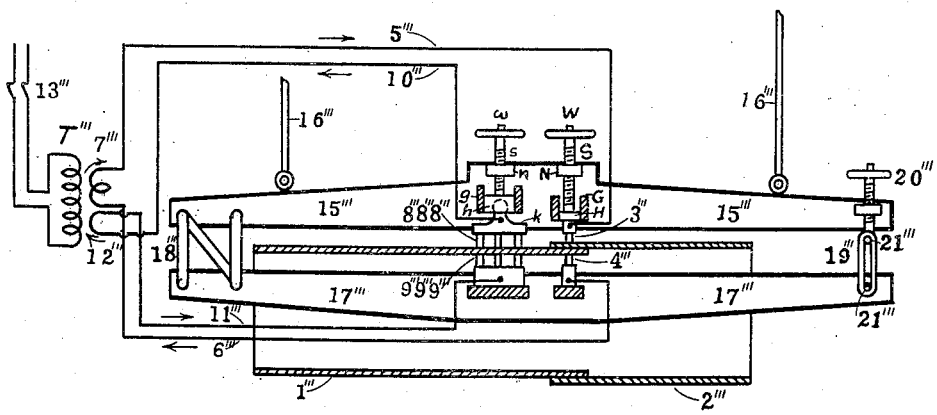

Figure 1 is an elevation, partially sectioned, illustrating the method of employing two welding circuits simultaneously, the welding terminals being supported by two suspended beams. Fig. 2 is a diagrammatic sketch, illustrating the method of employing two welding circuits simultaneously, in which the directions of the currents are opposed so as to eliminate self-inductance and eddy currents. Fig. 3 is a diagrammatic sketch, illustrating the method of using one welding circuit and another circuit solely for eliminating self-inductance and eddy currents, a portion of which latter circuit has been passed around the core of a transformer. Fig. 4 is an enlarged sectional view of the welding terminals of Fig. 1, showing their special construction and method of operation. Fig. 5 is a view similar to Fig. 1, showing a modification.

For convenience of explanation, reference will first be made to Fig. 2, in which 1'—1' and 2'—2' are sections of a cylindrical shell. The welding terminals 3'—4' of one welding circuit are connected by conductors 5'—6' to one secondary 7' of a welding transformer T'. The welding terminals 8'—9' of a second welding circuit are connected by conductors 10'—11' to a second secondary 12' of welding transformer T'. A switch 13' connects transformer to a source of alternating current. A strip 14' is being spot-welded to the shell 1'—1'—2'—2'. Longitudinal and transverse joints of cylindrical shells may be welded up in this method by properly locating the welding terminals.

The welding process is as follows: Press terminals 3'—4' into firm contact with plates and directly opposite on either side of thickness of plate and strip 14'. Press terminals 8'—9' into firm contact with plates and directly opposite on either side of thickness of plate and strip 14'. Close switch 13'. Alternating welding current flows from transformer secondary 7' through conductor 5', terminal 3', strap 14', cylindrical shell, terminal 4' and conductor 6' back to secondary 7'. At same time, alternating welding current flows from transformer secondary 12' through conductor 11', terminal 9', cylindrical shell, strap 14', terminal 8' and conductor 10' back to secondary 12'. Secondary 12' is connected in an opposite direction to secondary 7', so that at any instant the currents in adjacent conductors, as in 5' and 10' or in 6' and 11', are flowing in opposite directions. This prevents self-inductance and eddy currents. The heat generated between terminals 3'—4' and 8'—9' brings the plates at these points to a welding temperature and under the pressure welds are effected. Switch 13' is opened, the pressure on 8'—9' and 3'—4' is removed. Move cylinder and repeat operation.

Reference will now be made to Fig. 3, in which 1" and 2" are iron or steel plates to be spot-welded together. The welding terminals 3"—4" of a welding circuit are connected by conductors 5"—6" to secondary 7" of a welding transformer T". The auxiliary terminals 8"—8"—8" and 9"—9"—9" are connected by conductors 10"—11" to secondary 12" of transformer t. Transformers T" and t are connected by switch 13" to a source of alternating current. Terminals 8"—8"—8" are held into firm contact with the plate by springs a—a—a. Terminals 9"—9"—9" are held into firm contact with the plate by springs b—b—b. A plurality of contacts insures a larger contact surface than is possible with one set of contacts. The welding process is as follows: Press welding terminals 3"—4" into firm contact with plates and directly opposite on either side of their thickness at the joint. Press terminals 8"—8"—8" and 9"—9"—9" into firm contact with plate 1" and directly opposite on either side thereof. Close switch 13". Alternating welding current flows from transformer secondary 7" through conductor 5", terminal 3", edges of plates 1"—2", terminal 4" and conductor 6" back to secondary 7". At same time, auxiliary alternating current flows from transformer secondary 12" through conductor 11", terminals 9"—9"—9", plate 1", terminals 8"—8"—8" and conductor 10" back to secondary 12". The primaries of transformers T" and t are connected opposite, so that the current in secondary 12" and the auxiliary circuit is opposite in direction to the current in secondary 7" and the welding circuit. This prevents self-inductance and eddy currents. The currents in the two circuits should be the same. The transformer t would not have to be as large as T". The heat developed between terminals 3"—4" brings the plate edges to a welding heat, and under the pressure a weld is effected. Switch 13" is opened, pressures on welding and auxiliary terminals is removed. Move plate and repeat operation.

Reference will now be made to Fig. 1, in which 1—1 and 2—2 are sections of a cylindrical shell. The welding terminals 3—4 of one welding circuit are connected by conductors 5—6 to one secondary 7 of a welding transformer T. The welding terminals 8—9 of a second welding circuit are connected by conductors 10—11 to a second secondary 12 of welding transformer T. A switch 13 connects to a source of alternating current. The welding terminals 3—8 are supported upon a beam 15—15, here shown suspended from above by rods 16—16. Welding terminals 4—9 are supported upon a beam 17—17, connected to beam 15—15 at one end by link 18, at the other by link 19. Link 19 is a comparatively thin member, slotted and removable. Its upper end is connected to bell crank 20. Normally it supports beam 17—17 by linking over pins 21—21. Link 22 is adapted to link over pins 23—23 and to support beam 17—17 when it is necessary to remove link 19 so as to take out a welded shell or for any other purpose. Unwelded cylindrical sections of metal may be introduced with link 19 in place by allowing this member to pass through the gap at the unwelded horizontal joint. These beams are adapted to handle a cylinder of approximately half their length,—as 1—2—1—2 which is mounted on truck 24. Terminals 4—9 are mounted on a head 25, adapted to be held down by spring 26. Means are provided for raising head 25 by hydraulic or pneumatic pressure. The plunger cylinder 27 is connected by pipe 28 to a three way valve 29 operated by handle 30. Terminals 3—8 are mounted on a head 31 adapted to be held up by spring 32. Means are provided for pressing head 31 down by hydraulic or pneumatic pressure. The plunger cylinder 33 is connected by pipe 34 to three way valve 29 operated by handle 30. Strong electro-magnets would also be effective as means for pressing terminals 3—4—8—9 against the shell. The two simple beams 15—15 and 17—17 may be supported by rods 16—16 from above by a roof girder or other frame work. It is adapted to be carried around the shop by a traveling crane. The terminals 3, 8, 4 and 9 are of special construction better illustrated in enlarged view Fig. 4. The copper welding terminal consists of a core 35 surrounded by a ferrule 36. This ferrule serves the double purpose of transmitting the pressure from the head or shoe 37 to the plate 1—2 and also of holding the copper core 35 intact and in shape when subjected to heating. It is preferable to make the ferrule of such material that it will not fuse against the iron plate at the circle of contact. To line this edge with a special material is a good scheme. But I prefer to insert, from time to time, a thin clean copper sheet 38 between the welding terminals and the plate 1—2. This will serve the triple purpose of preventing any fusion of the ferrule to the plate 1—2, of affording a larger area of good electrical contact on a rough plate, and of replenishing the copper core as it burns and wears away under usage. This type of welding terminal may be used for both or either one of the sets of terminals in a welding circuit.

The welding process is as follows: A cylindrical section of metal is introduced by allowing link 19 to pass through the gap at the unwelded horizontal joint. In welding up a horizontal joint the iron shell may be moved along as the work proceeds by mounting on a truck 24. Adjust the shell so that the welding terminals will come in contact with it at the points where welds are desired. Turn handle 30 so as to introduce pneumatic or hydraulic pressure into cylinders 27 and 33. Welding terminals 3—8 are pressed firmly against the shell directly opposite terminals 4—9 respectively. Close switch 13. Heavy alternating welding current flows from transformer secondary 7 through conductor 5, terminal 3, cylindrical shell, terminal 4 and conductor 6 back to secondary 7. At same time, heavy alternating welding current flows from transformer secondary 12 through conductor 11, terminal 9, cylindrical shell, terminal 8 and conductor 10 back to secondary 12. Secondary 12 is connected in an opposite direction to secondary 7, so that at any instant the current in adjacent conductors, as in 5 and 10 or in 6 and 11, are flowing in opposite directions. This prevents self-inductance and eddy currents. The passage of the heavy currents between terminals 3—4 and 8—9 brings the metal of the plates at these points to a welding temperature, and under the applied pressure welds are effected. Switch 13 is opened, the pressure in cylinders 27 and 33 is relieved by operating handle 30 of three way valve 29. Springs 26 and 32 draw terminals 4—9 and 3—8 respectively away from the shell. Move cylinder and repeat operation. Transverse joints may be welded up by rotating 90 degrees the heads 25 and 31, which carry the welding terminals 4—9 and 3—8 respectively. The completed cylinder may be removed by moving to the extreme right, drawing down on handle of bell-crank 20 so as to raise beam 17—17, placing link 22 around pins 23—23, removing link 19 from around pins 21—21 and moving the cylinder out the open end. Moreover, it is apparent that simplified means may be employed for applying welding terminals by having 4—9 mounted on beam 15—15 and be adapted to pressing 3—8 down on the plate directly opposite by a large jack screw operated by hand wheel or lever. This screw may be mounted on beam 15—15 and be adapted to force downward head 31. Or the screw may be substituted for link 18 and adapted to close welding terminals by decreasing the distance between beams 15—15 and 17—17.

Referring to Fig. 5: The construction and operation is similar to Fig. 1. One welding circuit is used. Handwheel W is employed to rotate screw S through nut N and force head H downward between guides G. This presses welding terminal 3''' against the plate opposite welding terminal 4'''. Handwheel w is employed to rotate screws s through nut n and force head h downward between guides g. This passes auxiliary terminals 8'''—8'''—8''' against the plate directly opposite auxiliary terminals 9'''—9'''—9'''. A self-adjusting shoe k is attached by a ball and socket type of joint to head h, and carries the three terminals 8'''—8'''—8'''. This arrangement affords a large surface of contact and facilitates the making of a good contact on an irregular surface, and is self-adjusting for uneven wear of the terminals.

The welding process is as follows: Screw down firmly screws S and s by means of handwheels W and w. Close transformer-switch 13'''. Welding current flows in the direction 7'''—5'''—3'''—4'''—6'''. Auxiliary current flows in the direction 12'''—11'''—9'''9'''9'''—8'''8'''8'''—10'''. This prevents self-inductance and eddy currents and allows the welding current to flow. The heat generated and the pressure applied between terminals 3'''—4''' effect a weld.

What I claim is,—

1. A method of electric welding which consists of conducting around metallic material and applying simultaneously two welding currents opposite in direction of flow.

2. A method of electric welding which consists of conducting around metallic material and applying a welding current, and of conducting around said metallic material another current, opposite in direction and derived from the same supply as said welding current.

3. A method of electric welding which consists of conducting from a transformer secondary a welding current around metallic material, of applying the same, and of conducting from another secondary of a transformer a current in an opposite direction around said metallic material.

4. A method of electric welding which consists of conducting from a transformer secondary a welding current of applying the same and of conducting from another secondary of a transformer a reversed current in close proximity to said welding current.

5. A method of electric heating a metallic object, which consists of conducting around metallic material and applying simultaneously two heating currents opposite in direction of flow.

6. A method of electric heating a metallic object which consists of conducting around metallic material and applying a heating current, and of conducting around said metallic material another current opposite in direction and derived from the same supply as said heating current.

7. A method of heating a metallic object which consists of conducting from a transformer secondary a heating current around metallic material, of applying the same and of conducting from another secondary of a transformer a current in an opposite direction around said metallic material.

8. In combination with an apparatus for electric welding comprising conductors for carrying the welding current around metallic material of other conductors in close proximity to said former conductors, said latter conductors connected in series with an external source so as to furnish the current opposed in direction to the welding current in said former conductors.

9. In combination with an apparatus for electric welding comprising conductors for carrying the welding current around metallic material, of other conductors looped about said metallic material and closed circuited around an iron core subjected to an alternating flux.

10. In combination with an apparatus for electric heating comprising conductors for carrying the heating current around metallic material, of another pair of conductors looped about said metallic material and closed circuited around an iron core subjected to an alternating flux.

11. An apparatus for fastening metals together, comprising two sets of conductors adapted to convey two electric currents around metallic material, said sets of conductors being inductively and oppositely connected to the same supply.

12. An apparatus for electric welding or heating, comprising a transformer having two secondaries and two sets of conductors, said sets of conductors being adapted to convey currents around metallic material and being oppositely connected to said secondaries.

In testimony whereof, I have hereunto signed my name in the presence of two subscribing witnesses at Atlanta, in the county of Fulton and State of Georgia, this 11th day of October, 1913.

CHAS. H. KICKLIGHTER.

Witnesses:
W. NORMAN SMITH,
M. L. THROWER.